United States Patent [19]

Hinds

[11] Patent Number: 4,795,058
[45] Date of Patent: Jan. 3, 1989

[54] SHIPPING CONTAINER PORT ASSEMBLY
[75] Inventor: Farley T. Hinds, Dayton, Ohio
[73] Assignee: The United States of America as represented by the Secretary of the Air Force, Washington, D.C.
[21] Appl. No.: 142,899
[22] Filed: Jan. 11, 1988
[51] Int. Cl.⁴ ............................................. F02B 5/00
[52] U.S. Cl. .................... 220/465; 220/375; 220/288
[58] Field of Search ............. 220/465, 375, 296, 85 F, 220/85 CH, 1.5, 288

[56] References Cited
U.S. PATENT DOCUMENTS

| 1,762,757 | 6/1930 | Behnke | 220/288 |
| 1,915,300 | 6/1933 | Draper | 220/ |
| 2,146,587 | 2/1939 | Merolle | 220/296 |
| 2,446,155 | 7/1948 | Karle | 220/375 X |
| 2,601,017 | 6/1952 | Herrick | 220/375 X |
| 3,384,259 | 5/1968 | Hoffstadt | 220/465 |
| 3,393,824 | 7/1968 | Appleton | 220/375 X |
| 3,490,177 | 1/1970 | Perrion | 220/375 X |
| 3,904,072 | 9/1975 | Whiteside | 220/ |
| 4,238,046 | 12/1980 | Vogt | 220/ |
| 4,399,926 | 8/1983 | Eidels-Dubovoy | 220/ |
| 4,706,836 | 11/1987 | Greck | 220/288 X |

Primary Examiner—Steven M. Pollard
Attorney, Agent, or Firm—Bobby D. Scearce; Donald J. Singer

[57] ABSTRACT

An access port structure for a shipping container is described comprising a cylindrical body member for welding to the shipping container, a port cover for threaded engagement by hand with the body member, a gasket for sealing the cover to the body member, and a retaining cable connecting the cover and gasket to the body member.

2 Claims, 1 Drawing Sheet

SHIPPING CONTAINER PORT ASSEMBLY

RIGHTS OF THE GOVERNMENT

The invention described herein may be manufactured and used by or for the Government of the United States for all governmental purposes without the payment of any royalty.

BACKGROUND OF THE INVENTION

The invention relates generally to shipping container structures and more particularly to an improved shipping container port structure especially useful in double wall metallic containers.

Certain welded metallic shipping container structures require ports for insertion into the container or into the space between the inner and outer containers of double wall container structures, of desiccant, insulation or other protective material for items or materials packaged within the container. Existing port structure configurations for welded mettalic containers suffer from one or more shortcomings severely limiting their utility. For example, tools are normally required to open existing port structures for insertion of protective materials into the shipping container. Existing structures generally comprise numerous component parts, some of which often become lost in routine use, which severely impairs utility of the container as a whole. One model having plastic parts including a plastic cap is generally unacceptable since the cap has a tendency to size up and the structure ordinarily requires sealing compound, gaskets and/or screws for attachment to the shipping container. A simple rubber gasketed cap-type nut structure of another model may be useful for single wall containers, but is of limited usefulness in double wall extruded container structures.

The invention eliminates or reduces in critical importance shortcomings in existing port structures as suggested above by providing an access port structure which is easily weldable into a metallic container, is reliable and is of substantially lower cost than previously existing port structures. The invention comprises three essential parts, namely, a cylindrical body member for welding to the shipping container, a port cover for threaded engagement with the body member and a basket for sealing the cover to the body member. The cover may include a closable threaded hole for receiving a valve for monitoring internal container atmosphere or for pressure testing the container. The cover and gasket are attachable to the body member usinq a cable to preclude loss of component parts. The cover is configured to sealably engage or disengage the body member with a single three-fourths turn by hand which allows access to the container through the port without use of tools.

It is therefore, a principal object of the invention to provide an improved shipping container.

It is further object of the invention to provide an improved port structure for a double wall welded shipping container.

These and other objects of the invention will become apparent as the detailed description of representative embodiments proceeds.

SUMMARY OF THE INVENTION

In accordance with the foregoing principles and objects of the invention, a port structure for a shipping centainer is described comprising a cylindrical body member for welding to the shipping container, a port cover for threaded engagement by hand with the body member, a gasket for sealing the cover to the body member and a retaining cable connecting the cover and gasket to the body member.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
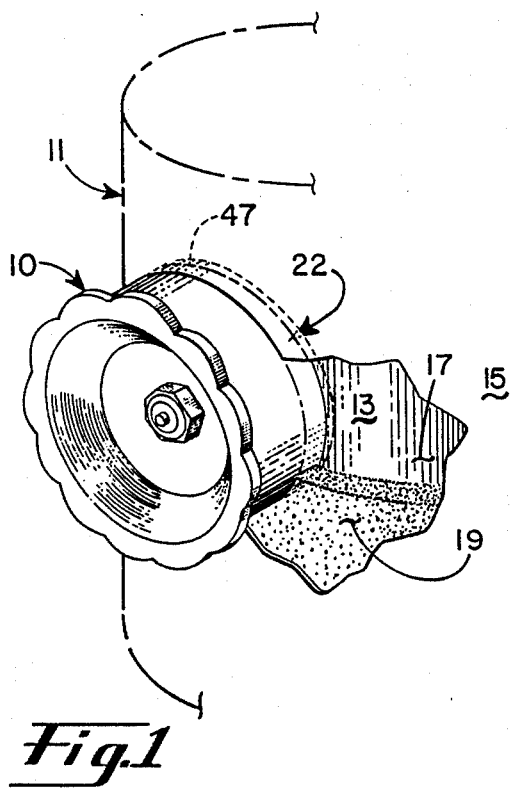
FIG. 1 is a schematic of a container port assembly of the invention installed on a double wall metallic shipping container.

Referring now to the drawings, FIG. 1 shows a schematic of the shipping container access port assembly 10 of the invention as installed on a metallic double wall shipping container 11. Shipping container 11 may comprise substantially any double wall construction including inner container 13 and outer container 15 separated by a space 17 for receiving desiccant, insulation or the other material 19 in generally comminuted form capable of being poured into space 17. Container 11 may comprise any suitable conventional weldable structural material typically used for shipping containers including aluminum, steel or other metal or alloy, the material of container 11 not being limiting of the invention.

Figure 3:
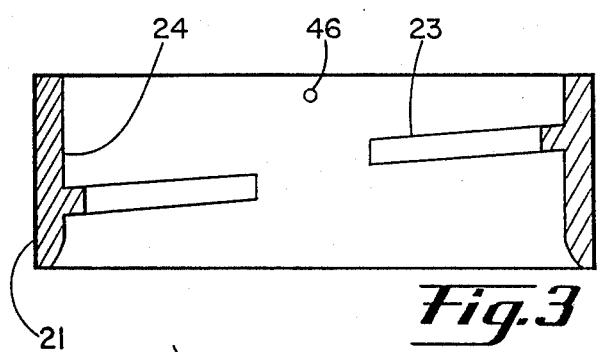
FIG. 3 is a view along line A—A of FIG. 2.
Figure 2:
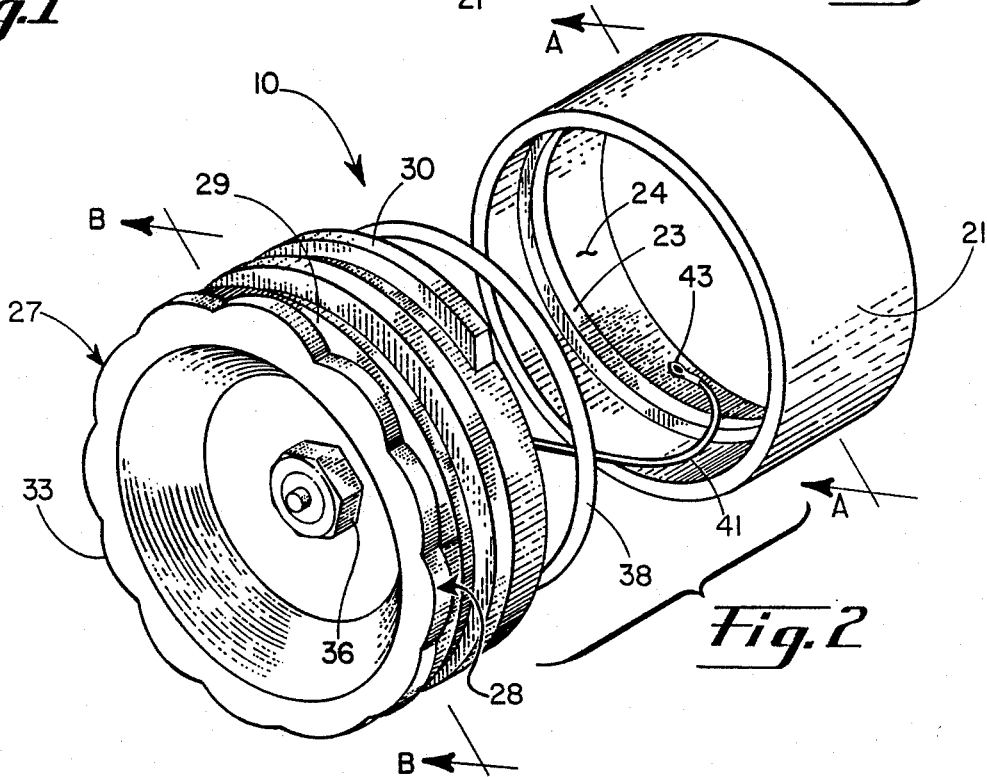
FIG. 2 is an exploded view of the port assembly of FIG. 1.

Referring now to FIG. 2, shown therein is an exploded view of assembly 10 illustrating the component parts thereof. Assembly 10 comprises a generally cylindrically shaped metallic body member 21 of suitable metallic material compatible for hermetic welding or both walls of container 11 at an opening 22 provided in container 11. Referring now additionally to FIG. 3, shown therein is a sectional view of body member 21 taken along line A—A of FIG. 2. A single thread element 23 is formed on the inner surface 24 of body element 21 for receiving corresponding threads of the port cover described below. Body member 21, and assembly 10 overall, may be any desirable size corresponding to the size, construction materials and intended purpose of shipping container 11.

Port cover 27 of assembly 10 comprises a hub member 28 having near one end thereof a cylindrical portion 29 having on the outer surface thereof threads 30, portion 29 and threads 30 being sized and configured for threaded engagement with thread member 23 of body member 21. At the other end of hub member 28 is an enlarged portion 32 having means defined on the periphery thereof for facilitating gripping and manually turning hub member 28, representative means being illustrated in FIG. 2 as scalloped edge 33. Defined centrally of hub member 28 is axial hole 35 for receiving a pressure relief valve (not shown), if desired, for monitoring pressure within space 17 or for periodic pressure test of inner and outer containers 13,15 or other inspection of shipping container 11. In routine use, it may be appropriate to install at axial hole 35 a gasketed screw fitting 36 for sealing purposes. Gasket 38 is inserted between port cover 27 and body member 21 for sealing port cover 27 and body member 21 upon engagement thereof.

Figure 4:
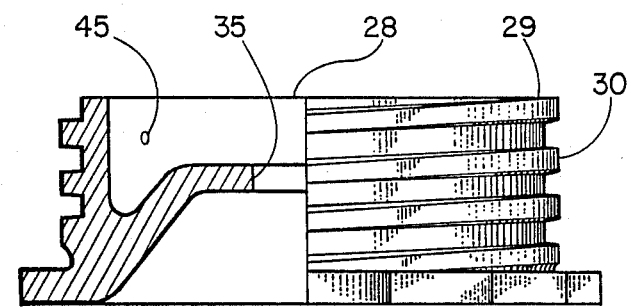
FIG. 4 is a view along line B—B of FIG. 2.

Referring now collectively to FIGS. 2,3,4, security cable 41 may be included in the assembly depicted in FIG. 2 to prevent loss of component parts in routine use of assembly 10. Accordingly, cable 41 of appropriate length and diametric size may include means at each end thereof for attachment to port cover 27 and body member 21. In the example illustrated in the figures, a cable clamp or ferrule 43 at each end of cable 41 may be attached at respective tapped holes 45,46 in port cover 27 and body member 21.

The component parts of assembly 10 may be fabricated by any suitable process such as by casting, molding, machining or the like as is appropriate to the size and selected material for assembly 10. In a unit built in demonstration of the invention, assembly 10 comprised A356 aluminum alloy for welding compatibility to a shipping container 11 of 5000 or 6000 series aluminum alloy.

In the modification of a shipping container 11 to include port assembly 10 as suggested in FIG. 1, hole 22 is cut in the walls of container 11 of size for snugly receiving body member 21. Body member 21 is then welded to inner container 13 as at 47 (FIG. 1) (or to both containers 13,15) by a seal Weld (e.g., about 0.12 to 0.18 inch wide). Cable 41, gasket 38 and port cover 27 may be then assembled to body member 21. As suggested above, thread member 23 is configured to extend less than the full circumference of inner surface 24 so that thread member 23 fully engages threads 30 on cylindrical portion 29 of port cover 27 by less than a full turn. In the demonstration unit port cover 27 was engageable/removable by hand with a clockwise/counter-clockwise 270° (three-fourth full) rotation.

It is noted that assembly 10 may be welded into a single wall shipping container or the outer wall only of container 11 substantially as described above as would occur to one skilled in the field of the invention guided by these teachings.

The invention therefore provides an inexpensive, substantially improved access port assembly for use in conjunction with substantially any metallic double wall shipping container for insertion and removal of desiccant, insulation or the like from the shipping container, may be sized for convenient welding into the outer wall of the shipping container, and may be opened and closed easily by hand without use of tools. It is understood that modification to the invention may be made, as would occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

I claim:

1. An access port assembly for a metallic shipping container comprising:
   (a) a hollow cylindrical segment of preselected size for welding at a first end thereof into a wall of a metallic shipping container;
   (b) a single thread formed on the inner surface of said hollow cylindrical segment, said single thread extending less than the full circumference of said inner surface of said hollow cylindrical segment;
   (c) a hub member including thread means sized for engaging said single thread and providing sealing engagement of said hub member with said hollow cylindrical segment with less than a single rotation of said hub member;
   (d) said hub member having on the periphery thereof means for gripping said hub member for attachment and removal by hand of said hub member to and from said hollow cylindrical segment;
   (e) an annular gasket between said hub member and said hollow cylindrical member, said gasket sized for providing said sealing engagement of said hub member with said hollow cylindrical segment; and
   (f) a cable attached at respective ends thereof to said hollow cylindrical segment and hub member, said cable extending through the interior of said gasket for securing said gasket and hub member to said hollow cylindrical segment.

2. The access port assembly of claim 1 wherein said means for gripping said hub member comprises a plurality of scallops formed on the periphery of said hub member.

* * * * *